United States Patent [19]  [11]  4,089,806
Farrell et al.  [45]  May 16, 1978

[54] METHOD FOR REJUVENATING HYDROPROCESSING CATALYSTS

[75] Inventors: Daniel R. Farrell, Anaheim; John W. Ward, Yorba Linda, both of Calif.

[73] Assignee: Union Oil Company of California, Los Angeles, Calif.

[21] Appl. No.: 783,666

[22] Filed: Apr. 1, 1977

[51] Int. Cl.$^2$ .................. B01J 21/20; B01J 23/94; C10G 23/02

[52] U.S. Cl. ................... 252/413; 208/216; 208/217; 252/412

[58] Field of Search ............ 252/413, 412, 414; 208/216

[56] References Cited

U.S. PATENT DOCUMENTS

| | | | |
|---|---|---|---|
| 2,289,784 | 7/1942 | Houghton | 252/413 |
| 2,704,281 | 3/1955 | Appell | 252/413 |
| 3,324,044 | 6/1967 | Oberhoffer | 252/413 |
| 3,791,989 | 2/1974 | Mitchell et al. | 252/413 |

Primary Examiner—Winston A. Douglas
Assistant Examiner—P. E. Konopka
Attorney, Agent, or Firm—Gregory F. Wirzbicki; Richard C. Hartman; Lannas S. Henderson

[57] ABSTRACT

A process for removing vanadium and nickel deactivants from contaminated hydrodesulfurization catalysts comprising Group VIB and/or VIII active components on refractory oxide supports comprising contacting said catalysts with an aqueous solution of (1) oxalic acid and (2) at least one inorganic component selected from the class consisting of nitric acid and water-soluble nitrate salts. The removal of vanadium and nickel contaminants from the surface of a deactivated catalyst by the process of the invention substantially rejuvenates the catalyst for hydrodesulfurization purposes, provided such removal is accomplished prior to burning off any coke that may also be present on said catalysts.

9 Claims, No Drawings

METHOD FOR REJUVENATING HYDROPROCESSING CATALYSTS

BACKGROUND OF THE INVENTION

1. Field of the Invention

This invention relates to the restoration of catalytic activity of hydrodesulfurization catalysts that have become deactivated in service due to the deposition thereon of vanadium and nickel deactivants.

2. Description of the Prior Art

Many hydrocarbon feedstocks, such as 650° F + atmospheric residual oils or 900° F + vacuum residual oils, must be refined by hydroprocessing methods to obtain a product oil of improved characteristics. One such method is hydrodesulfurization, a process primarily to reduce the sulfur content of the oil but which also may reduce the nitrogen content, depending on the severity of the operating conditions. Hydrodesulfurization is accomplished by contacting the residual feedstock at elevated temperatures (about 550°–780° F) and pressures (about 600–2500 psig) with catalyst particles comprising one or more Group VIB and/or Group VIII active components on a refractory oxide support. The contacting is done in the presence of hydrogen and (usually in the presence of steam) under conditions selected to produce a product oil substantially reduced in nitrogen and sulfur content.

A problem is encountered in hydrodesulfurizing most residual oils because such hydrocarbon feeds usually contain high concentrations of vanadium and nickel components (usually 50–1000 wppm of Ni + V calculated as the metals). During hydrodesulfurization, some of these vanadium and nickel components deposit upon the hydrodesulfurization catalyst, most probably in the form of organo-metallic compounds and/or one or more metallic sulfides. Deposited in such forms, nickel and vanadium deactivate the hydrodesulfurization catalyst in a manner that appears to involve plugging of the catalyst pores. It addition, these catalysts are further deactivated during hydrodesulfurization when coking of the catalyst occurs concomitantly with the deposition of nickel and vanadium deactivants. In extreme cases the catalyst loses essentially all its original activity because of coking and metals deposition.

The deactivation of hydrodesulfurization catalysts as described hereinabove is clearly undesirable. When a catalyst has lost a substantial proportion of its activity, hydrodesulfurization becomes more difficult. Increased operating temperatures and pressures become necessary to remove the required amount of sulfur and nitrogen from the hydrocarbon feedstock. This naturally increases the cost of producing valuable conversion products containing these elements in low concentrations. Thus, it is very desirable either to prevent the coke or metal deactivants from depositing on the catalysts or to devise a feasible method of restoring the activity of the catalysts after such deposition.

Much work has been done to discover an aqueous or organic solution which will restore the activity of hydrodesulfurization catalysts by removing vanadium and nickel components. In U.S. Pat. No. 3,791,989 issued to Mitchell et al. a process is disclosed for recovering catalytic activity of fouled hydroprocessing catalysts by (a) using a concentrated solution of oxalic acid to remove vanadium sulfide deactivants and then (b) de-coking the catalyst by an oxidative burn-off. No data, however, are given in this reference for the activity of treated catalysts following the practice of this method. In attempting to utilize this method on catalysts heavily deactivated during desulfurization, it has been found that oxalic acid dissolves alumina supports in environments severe enough to remove substantial amounts of vanadium. In some cases, little vanadium is removed even when high concentrations of oxalic acid are used at elevated temperatures.

SUMMARY OF THE INVENTION

In accordance with this invention, deactivated hydrodesulfurization catalysts comprising one or more Group VIB and/or Group VIII active components composited with an inorganic refractory oxide are reactivated by contact with an aqueous solution of (1) oxalic acid and (2) at least one inorganic component selected from the class consisting of nitric acid and water-soluble nitrate salts. Deactivated catalysts treated in this manner recover substantial proportions of their original activity. Oftentimes the rejuvenated catalyst will have over 80% of the original hydrodesulfurization activity when over 50% of the nickel plus vanadium deactivants (calculated as the metals) is removed.

All weight-percent data herein, whether of active metals or deactivants on the catalyst, are reported in terms of the weight of the fresh catalyst, i.e., the weight of the catalyst prior to use in hydrodesulfurizing a feedstock.

DETAILED DESCRIPTION OF THE INVENTION

The present process for rejuvenating deactivated hydrodesulfurization catalysts by removal of vanadium and nickel deactivants from the surface thereof is applied to a hydrodesulfurization catalyst comprising a composite of one or more Group VIB and/or Group VIII active components and an inorganic refractory oxide support, such as alumina, silica-alumina, and the like. Usually, the active components of hydrodesulfurization catalysts comprise a molybdenum or tungsten component in combination with a nickel and/or cobalt components, said metal components generally being in the oxide or sulfide form. When deactivated, these hydrodesulfurization catalysts are fouled with coke and metallic deactivants of vanadium and nickel. Hydrodesulfurization catalysts are considered lightly or moderately deactivated when they contain less than 5 wt. % of nickel plus vanadium deactivants (calculated as the metals). The process herein described is most effectively used to treat heavily deactivated hydrodesulfurization catalysts, which contain at least 5 wt. % of nickel plus vanadium deactivants, and which have a crushing strength of at least 10 lbs/in$^2$.

According to the present invention, such catalysts are reactivated by contact with an aqueous regenerant solution comprising oxalic acid and one or more water-soluble, nitratecontaining compounds selected from the class consisting of nitric acid and water-soluble inorganic nitrate salts. Suitable nitrate salts include sodium nitrate, ammonium nitrate, potassium nitrate, calcium nitrate, magnesium nitrate, copper nitrate, etc., with the preferred salt being aluminum nitrate. The preferred aqueous regenerant solution contains nitrate ions from a dissolved nitrate salt in a concentration between 50 and 75 g/l and oxalic acid in a saturated concentration. Suitable aqueous solutions contain nitrate ions in a concentration between 40 and 100 g/l and oxalic acid in a concentration above 20 g/l. When an aqueous regenerant solution is used containing oxalic acid in a saturated concentration, it may also contain excess oxalic acid, in solid form, to maintain the saturated concentration of oxalic acid in the solution.

The contacting of the aqueous regenerant solution and deactivated catalyst is conducted in any of a number of convenient ways. Soaking the catalyst in the aforementioned solutions is effective, and so also is the use of a pump to recycle the aqueous solutions through the catalyst particles. The following are the conditions under which the contacting should be accomplished.

TABLE I

|  | Operable | Preferred |
|---|---|---|
| pH | 0.1 – 4 | 0.5 – 1.5 |
| Temperature, °F | 30 – 100 | 60 – 80 |
| Time, hrs. | 2 – 500 | 10– 100 |
| Ratio of Volume of Solution to Catalyst Weight, 1/gm | 0.005 – 10 | 0.05 – 1 |

A recommended time period for contacting is two hours per each weight percent of nickel plus vanadium deactivants (calculated as the metal on the catalyst). It should also be noted that the temperature and concentration of nitrate ion in the aqueous solutions are critical. If the temperature of contacting is above about 120° F for an extended period of time, or if the concentration of nitrate ion exceeds 100 g/l, the catalyst being treated may disintegrate. Thus, care must be exercised in ensuring that a properly concentrated solution and a low temperature are maintained.

Hydrodesulfurization catalysts treated according to the preferred embodiment of the invention have substantial amounts of deactivant metals removed therefrom and, accordingly, are recovered in substantially reactivated form, with at least 25 percent of the deactivant metals removed. On the average, however, at least 50 percent of the nickel plus vanadium deactivants (calculated as the free metals) is removed. Oftentimes, at least 70 percent of the nickel plus vanadium deactivants is removed. Concomitant with such removal is the restoration of catalytic activity. The rejuvenated catalyst will have at least 30 percent, usually at least 70 percent, and on occasion over 80 percent of the original activity of the catalyst. Full restoration of catalytic activity, while possible, is not usually effected, primarily because the contacting as herebefore described generally removes a minor proportion (e.g., 10% or less) of the active components from the catalyst. Also, the treated catalyst usually contains some coke deactivants, which may limit the activity recovery to about 80 percent of the original catalystic activity.

Although it is within the scope of the invention to de-coke the catalyst subsequent to the treatment with the regeneration solution, i.e., by combusting the coke off the catalyst, it is preferred that the catalyst not be subjected to de-coking. Sufficient activity is restored by the method herein described without de-coking being necessary. Moreover, de-coking some heavily deactivated catalysts may actually result in a loss of some of the activity restored by the treatment with the regenerant solution. Such is especially the case with respect to those silica-alumina or alumina-containing hydrodesulfurization catalysts that were deactivated in a hydrodesulfurization application wherein steam was used to improve the efficiency of the process.

It is also a critical aspect of the invention that the deactivated catalyst should not be de-coked prior to treatment with the regenerant solution, primarily because such de-coking is generally counter-productive. De-coking by combustion prior to the treatment described herein releases $SO_2$ from the sulfur in the coke, which $SO_2$, in the presence of $O_2$ and the large quantities of vanadium deactivants on the catalyst, is converted to $SO_2$. The produced $SO_3$ and/or $SO_2$ plus $O_2$ then attacks most hydrodesulfurization catalyst supports (and sometimes the active metals thereon) by sulfation, thereby lowering the crushing strength, pore volume, surface area, and activity of the catalyst. In addition, de-coking converts molybdenum sulfide active components in such catalysts to molybdenum oxides, which are more soluble in the regenerant solutions used herein than are molybdenum sulfides. Therefore, to remove as little of the molybdenum active components as possible, the catalyst should not be de-coked by combustion prior to contact with the regenerant solution. Also, the presence of coke on the catalyst actually contributes to the rejuvenation process herein. It tends to protect the active components on the catalyst from being removed while also containing much of the vanadium and nickel deactivants in locations accessible to the regenerant solution.

The hydrodesulfurization catalysts rejuvenated by the process herein described recover sufficient activity for use once again in a hydrodesulfurization application. However, it is preferred that the rejuvenated catalyst particles be used in the first reactor of the train of several reactors which are normally required for severe hydrodesulfurization. When the rejuvenated catalyst is used in this manner, it not only is active for removing nitrogen and sulfur but also is especially suitable for demetallizing the entering feedstock. Thus, the first hydrodesulfurization reactor, filled with rejuvenated catalyst, becomes a "guard chamber" for removing vanadium and nickel components which might otherwise deactivate, or more quickly deactivate, the fresh catalyst in the remaining reactors. Hence, the use of the rejuvenated catalyst for demetallization, as well as hydrodesulfurization, obviates the expense of purchasing a catalyst specifically for demetallizing the feedstock.

The following Examples are provided to illustrate the invention.

EXAMPLE I

A hydrodesulfurization catalyst, prepared as described in Example 3 of U.S. Pat. No. 3,980,552 except that the finished catalyst contained 14.1 wt. % of Mo as $MoO_3$ and 4.7 wt. % of Co as CoO, consisted of molybdenum and cobalt active components on a support comprising alumina and silica. After being used to desulfurize a residual oil feedstock over an extended period of time, it was heavily deactivated with vanadium and nickel contaminants. As determined by atomic absorption spectroscopy techniques, the deactivated catalyst contained 14.1 wt. % of active molybdenum components (calculated as $MoO_3$) and 4.7 wt. % of active cobalt components (calculated as CoO) and 7.87 wt. % of vanadium deactivants and 2.26 wt. % of nickel deactivants, both calculated as the free metals.

Seventeen experiments were performed upon 3-5 gram samples of deactivated catalyst particles, each of which was contacted with a regenerant solution for a time and at a temperature as shown in Tables II and III. All of the regenerant solutions contained either or both of oxalic acid or aluminum nitrate ($Al(NO_3)_3.9H_2O$), except that used in Experiment No. 11, which contained nitric acid rather than aluminum nitrate.

The results of the experiments are tabulated in Tables II and III. When the solution contained only oxalic acid or nitrate anions, but not both, as in Experiments Nos. 1 and 2, only a slight amount of vanadium and essentially no nickel was removed (as compared to the untreated catalyst of Experiment No. 0). But when solutions containing both oxalic acid and nitrate ions in proportions falling within the scope of the invention were used under conditions also falling within the scope of the invention, as in Experiment Nos. 3-11, inclusive, the total amount of vanadium and nickel deactivants was reduced by more than 50%. Also, essentially no molybdenum active components and only a minor proportion of the cobalt active components were removed from the catalyst particles in Experiments Nos. 3-11, inclusive.

By way of contradistinction, Experiments Nos. 12-17 were conducted either with solutions or under conditions, or both, falling outside the scope of the invention. In Experiment No. 12, the use of a concentrated nitrate solution at high temperatures, while removing some nickel deactivants, removed no vanadium deactivants. It also removed more molybdenum plus cobalt active components than were removed in Experiments Nos. 3-11, inclusive. Using oxalic acid alone at high temperatures, as shown in Experiment No. 13, had virtually no effect upon the deactivated catalyst. Using high temperatures as in Experiment No. 14 with a solution containing both oxalic acid and nitrate ion not only removed the deactivants but also stripped away most of the active components. The results of Experiments Nos. 15 and 16, wherein insufficient proportions of nitrate ion were present in the regenerant solutions, show that hardly any vanadium deactivants were removed. On the other hand, the results of Experiment No. 17, wherein an excessive proportion of nitrate ion was present with oxalic acid in the regenerant solution indicate that such solutions remove an undesirable proportion of the active components and substantially destroy hydrodesulfurization catalysts.

EXAMPLE II

In order to determine the effectiveness of the rejuvenation process herein, the following experiment was performed to show the activity recovery of a desulfurization catalyst treated by the process of the invention.

Three samples of a desulfurization catalyst were identically tested for activity in an autoclave. The first sample was a catalyst freshly prepared as described in Example 3 of U.S. Pat. No. 3,980,552, which is herein incorporated by reference. The second sample was from the same batch of catalyst as the first sample but was deactivated by prolonged use in a pilot plant hydrodesulfurization unit. It contained 22.6 wt. % of vanadium contaminants and 8.1 wt. % of nickel contaminants (both calculated as the free metals) and 4.0 wt. % of Co as CoO, 11.9 wt. % of Mo as $MoO_3$, and 8.8 wt. % coke as C. The third sample was a portion of the second sample that had been contacted according to the method of this invention for 70 hours at 68° F with a regenerant solution (45 ml per gm of sample) comprising aluminum nitrate (62 g/l of nitrate ion) and oxalic acid (89 g/l). After the wash the third sample contained 10.1 wt. % vanadium contaminants, 3.3 wt. % nickel contaminants, 11.9 wt. % of Mo active components, and 3.6 wt. % of Co active components, all calculated as described for the second sample.

Each of the three samples was extracted with benzene to remove oil soluble material, dried at 230° F for 2 hours, then presulfided for 2 hours at 750° F and 1 atm with a flowing gas consisting of 90 vol. % $H_2$ and 10 vol. % $H_2S$. The samples were then individually activity tested. They were placed in a wire basket in an autoclave charged with sufficient xylenediluted Kuwait residual oil to produce a ratio of 0.030 volumes of catalyst particles for each volume of the xylene-diluted oil added. The autoclave was then pressurized to 1500 psig with a gas consisting of 90 vol. % $H_2$ and 10 vol. % $H_2O$ and then heated to 690° F, with continuous agitation of the oil being accomplished with a mechanical stirrer

TABLE II

| Experiment No. | Regenerant Solution, gm/l Oxalic Acid | NO₃ anion | Time, hr/ Temp, °F | % Deactivants as Free Metals V | Ni | % Active Metals Mo as MoO₃ | Co as CoO |
|---|---|---|---|---|---|---|---|
| 0 | none | none | no wash | 7.87 | 2.26 | 14.1 | 4.7 |
| 1 | 89 | none | 65.5/68 | 6.31 | 2.10 | 14.1 | 4.5 |
| 2 | none | 62 | 65.5/68 | 6.74 | 2.23 | 13.6 | 4.7 |
| 3 | 89 | 62 | 65.5/68 | 2.09 | 0.89 | 14.1 | 3.2 |
| 4 | 89 | 62 | 65.5/68 | 2.01 | 0.83 | 14.1 | 3.6 |
| 5 | 44.5 | 62 | 69/68 | 2.98 | 1.05 | 14.1 | 3.8 |
| 6 | 67.8 | 62 | 69/68 | 2.52 | 1.0 | 14.1 | 3.7 |
| 7 | 89 | 62 | 69/68 | 2.26 | 0.96 | 14.1 | N.D.* |
| 8 | saturated | 62 | 70/68 | 2.50 | 1.24 | 14.1 | 3.82 |
| 9 | 44.5 | 62 | 24/68 | 3.75 | 1.1 | 14.1 | 3.75 |
| 10 | 89 | 62 | 24/68 | 3.66 | 1.2 | 14.1 | 3.94 |
| 11 | 89 | 62 | 24/68 | 3.27 | 0.94 | 14.1 | 3.7 |

*N.D. = Not Determined.

TABLE III

| Experiment No. | Regenerant Solution, gm/l Oxalic Acid | NO₃ Anion | Time, hr/ Temp, °F | Wt. % Deactivants As Free Metals V | Ni | Wt. % Active Metals Mo as MoO₃ | Co as CoO |
|---|---|---|---|---|---|---|---|
| 0 | none | none | no wash | 7.87 | 2.26 | 14.1 | 4.7 |
| 12 | none | 248 | 5.0/150 | 7.87 | 1.54 | 13.4 | 3.6 |
| 13 | 250 | none | 0.75/200 | 7.86 | 2.25 | 14.1 | 4.7 |
| 14 | 185 | 127 | 0.75/190 | 1.1 | 0.1 | 6 | 1.3 |
| 15 | 89 | 31 | 24/68 | 7.31 | 1.7 | 14.1 | 4.26 |
| 16 | 89 | 31 | 24/68 | 7.40 | 1.8 | 14.1 | 4.2 |
| 17* | 89 | 125 | 24/68 | 2.07 | 0.52 | 13.1 | 2.7 |

*Note: The catalyst particles treated in this experiment lost essentially all of their crushing strength and were not suitable for further use as a hydrodesulfurization catalyst.

operating at 800 rpm. These conditions were maintained for 17.3 hours for the first and second samples and 16.6 hours for the third sample. Samples of the oil taken periodically were analyzed for sulfur content, and from the data obtained from these analyses the hydrodesulfurization activity of the catalyst samples were calculated.

Each of the catalyst samples exhibited some hydrodesulfurization activity in terms of the amount of sulfur removed from the oil as a function of time. The amount removed by the first sample, being the amount removable by a fresh catalyst, was arbitrarily given an activity of 100. The amount removed by the second sample (the deactivated catalyst) was only 9% of the first sample. Its activity was therefore given a rating of 9. The third sample, treated in accordance with the invention, had an activity of 82% of the first sample. Its activity rating of 82, therefore, is a representation of the recovery of a substantially large proportion of the lost activity of the deactivated catalyst even though none of the contaminant coke was removed.

It is also noted that the deactivated catalyst treated in accordance with the invention (the third sample) contained more than 10 wt. % of nickel plus vanadium deactivants yet still had an activity rating of 82. This is evidence of the fact that the method herein, for some unknown reason, removes those deactivants from the catalyst that are in sites most damaging to the activity of the catalyst.

Although the invention herein has been described in conjunction with specific embodiments and examples thereof, it is evident that many alternatives and variations will be apparent to those skilled in the art in light of the foregoing description. Accordingly, it is intended to embrace all such alternatives and variations that fall within the spirit and scope of the appended claims.

We claim:

1. A process for rejuvenating a hydrodesulfurization catalyst comprising at least one Group VIB and/or Group VIII active component supported on an inorganic refractory oxide, said catalyst being deactivated with coke and at least 5 wt. % of nickel plus vanadium deactivants, calculated as the metals, which process comprises, prior to coke burn-off, contacting at a temperature between about 30° and 100° F said catalyst with an aqueous solution comprising oxalic acid and at least one inorganic component selected from the class consisting of nitric acid, sodium nitrate, ammonium nitrate, potassium nitrate, calcium nitrate, magnesium nitrate, copper nitrate and aluminum nitrate, said solution containing at least 20 g/l of oxalic acid and between about 40 and 100 g/l of nitrate anion and said contacting being such that at least 25% of the nickel plus vanadium deactivants is removed and a substantial proportion of the hydrodesulfurization activity of the catalyst is restored.

2. A process as defined in claim 1 wherein said aqueous solution contains at least 20 g/l of oxalic acid and between 50 and 75 g/l of nitrate anion.

3. A process as defined in claim 2 wherein said solution contains aluminum nitrate.

4. A process as defined in claim 3 wherein said contacting is carried out for a time period of at least 2 hours and with at least 5 ml of aqueous solution per gram of catalyst contacted with said aqueous solution.

5. A process as defined in claim 2 wherein said contacting is carried out for a time period of at least 2 hours and with at least 5 ml of aqueous solution per gram of catalyst contacted with said aqueous solution.

6. A process as defined in claim 1 wherein at least 50% of the nickel plus vanadium deactivants is removed and the hydrodesulfurization activity of the rejuvenated catalyst is at least 70% of the hydrodesulfurization activity of the original catalyst.

7. A process as defined in claim 6 wherein said aqueous solution contains aluminum nitrate.

8. A process for rejuvenating a hydrodesulfurization catalyst comprising cobalt and molybdenum active components supported on an inorganic refractory oxide, said catalyst being deactivated with coke and at least 5 wt. % of nickel plus vanadium deactivants, calculated as the metals, which process comprises contacting, prior to coke burn-off and at a temperature in the range of 60°–80° F and for a time period between 10 and 100 hours, said catalyst with an aqueous solution containing oxalic acid in a concentration of at least 20 g/l and one or more inorganic components selected from the class consisting of nitric acid and aluminum nitrate in a concentration of between 50 and 75 g/l of nitrate anion so as to remove at least 50% of the nickel plus vanadium deactivants, thereby restoring a substantial proportion of the hydrodesulfurization activity of the catalyst.

9. A process as defined in claim 8 wherein said inorganic component is aluminum nitrate.

* * * * *